United States Patent [19]

Huber

[11] 4,212,419
[45] Jul. 15, 1980

[54] STRIP GUIDING DEVICE

[75] Inventor: Ernst Huber, Wettingen, Switzerland

[73] Assignee: Gretag Aktiengesellschaft, Regensdorf, Switzerland

[21] Appl. No.: 949,535

[22] Filed: Oct. 10, 1978

[30] Foreign Application Priority Data

Oct. 14, 1977 [CH] Switzerland ............... 12583/77

[51] Int. Cl.² ............... B65H 25/06; B65H 25/26
[52] U.S. Cl. ............................................. 226/23
[58] Field of Search ............... 226/18, 15, 17, 21, 226/23; 198/202

[56] References Cited

U.S. PATENT DOCUMENTS

| | | | |
|---|---|---|---|
| 2,262,638 | 11/1941 | Ferm | 226/23 |
| 3,593,841 | 7/1971 | Leow | 226/23 X |
| 3,664,561 | 5/1972 | Feiertag | 226/21 |
| 3,913,729 | 10/1975 | Andrews | 226/23 X |

Primary Examiner—Stanley N. Gilreath
Attorney, Agent, or Firm—Burns, Doane, Swecker & Mathis

[57] ABSTRACT

A device for guiding a strip so that it is kept in a predetermined lateral position as the strip moves from a supply to a take up reel. The device includes mechanical sensors sensing the lateral edges of the strip, the sensors being coupled by a differential linkage system to a frame in which is mounted a pair of rollers, one each side of the strip and in contact therewith. The frame is pivoted about an axis perpendicular to the strip so that if the strip shifts laterally the sensors move the differential linkage to pivot the frame and thereby cause the rollers, one of which is driven or braked, to impart a component of motion to the strip to move it back to its initial position.

3 Claims, 3 Drawing Figures

STRIP GUIDING DEVICE

FIELD OF THE INVENTION

The invention relates to a device for guiding a longitudinally moving strip.

When copies of photographs are prepared and given a border, it is very important for the lightsensitive paper strip to be very accurately guided when it moves through the exposure station, since even the slightest asymmetry may have a disadvantageous effect on the border.

The problem of accurately guiding the paper is made more difficult since the width of photographic paper may fluctuate in practice by up to 1 mm and thus cannot be guided simply by means of lateral abutments. On the other hand, symmetrically movable abutment rails, if used, will be expensive and will subject the paper to a force which may damage the edges.

PRIOR ART

German patent specification 599 474 discloses a strip-guiding device which has two sensing elements, each abutting a lateral edge of the moving strip, and a roller over which the strip travels, the roller extending at an angle to the strip. The roller has two bearings, which are movable parallel to the direction of motion of the strip, and are coupled to sensing elements by toggle levers. The two sensing elements are interconnected by a rigid gauge rod. If the strip shifts sideways, the sensing elements, acting via the toggle levers, adjust the roller bearings so that the roller is at an angle to the direction of motion of the strip and thus moves the strip back to its original or set track. The known device can compensate lateral deviations between the moving strip and its track, but is not able to compensate fluctuations in the width of the moving strip, owing to the rigid coupling between the two sensing elements.

OBJECT OF THE INVENTION

An object of the invention therefore is to produce a device whereby a moving strip can be accurately guided, without forcing or damaging it, so that its centre line travels through a fixed point thereby compensating for fluctuations in the width of the strip. Deviations from the set position preferably should not exceed 0.1 to 0.2 mm. The device is preferably driven by the actual strip, and capable of compensating temporary deviations of the strip from its set position without difficulty, even if the deviations are very large.

SUMMARY OF THE INVENTION

The invention seeks to provide a strip-guiding device which satisfies the above requirements, the device comprising a pair of rollers pivotable around an axis substantially perpendicular to the plane of a strip to be guided, the rollers rotating on opposite sides of the strip and at least one roller being driven; two sensing elements abutting opposite lateral edges of the strip; and a differential linkage which co-operates with the sensing elements so that if the centre line of the strip shifts, the pair of rollers is pivoted around said axis and applies a component of motion in the opposite direction to the shift thus moving the strip back.

BRIEF DESCRIPTION OF THE DRAWINGS

A preferred embodiment of the invention will now be described in detail with reference to the accompanying drawings in which.

DETAILED DESCRIPTION OF PREFERRED EMBODIMENT

Figure 1:
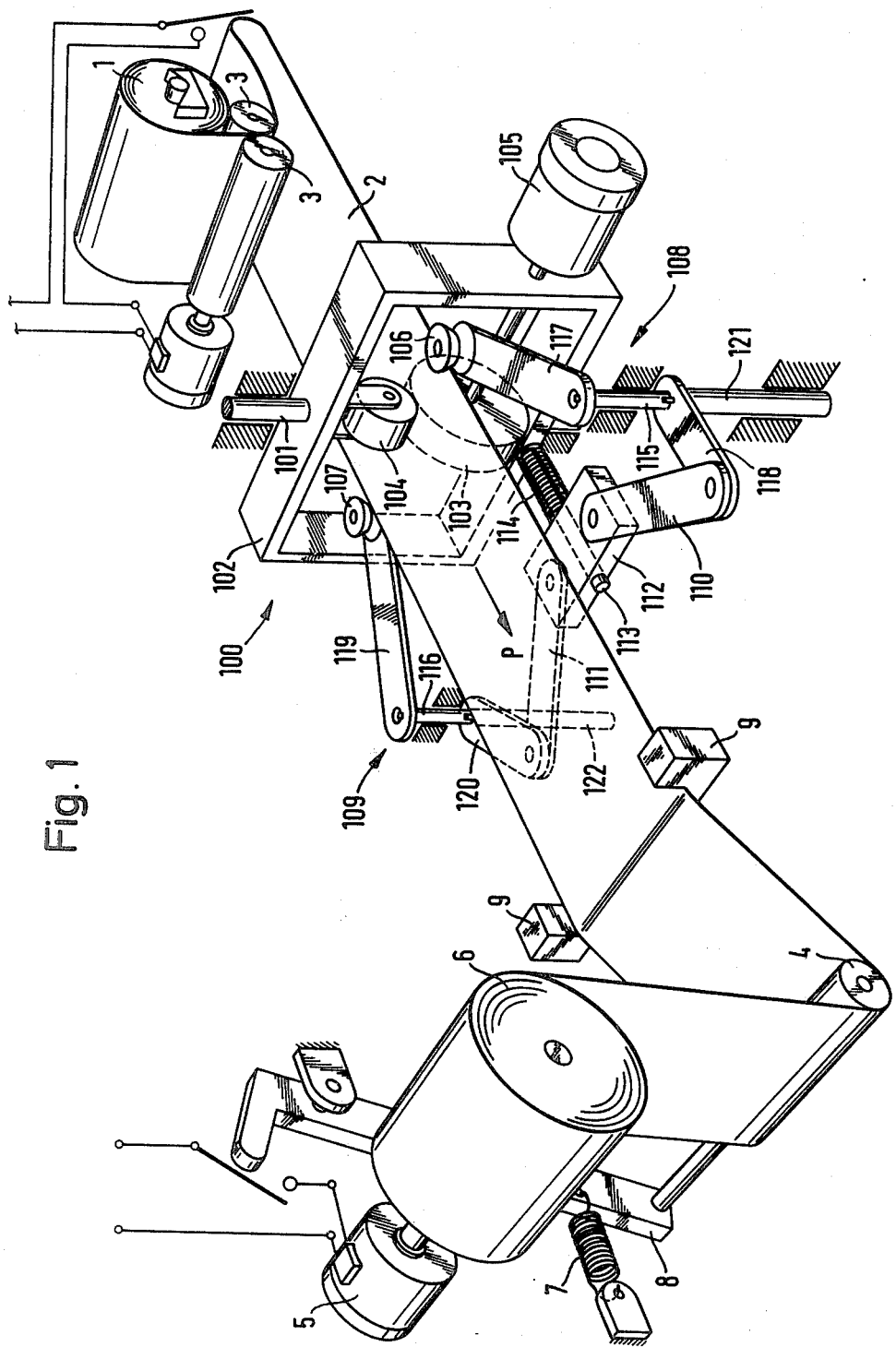
FIG. 1 is a perspective simplified sketch of an embodiment of a strip-guiding device in accordance with this invention.

A strip 2 to be guided e.g. photographic paper, moves from a supply roll 1 in the direction of an arrow P over rollers 3, 4 to a take-up roll 6 driven by a motor 5, and is wound on roll 6. Roller 4 is rotatably mounted on a rocking lever 8 loaded by a spring 7 and thus tensions strip 2 in the longitudinal direction. Between rollers 3 and 4, strip 2 is guided between two lateral abutments 9 and by a guide device denoted by the general reference 100.

Device 100 comprises a frame 102 pivotable around a vertical shaft 101, two rollers 103, 104 mounted in the frame, a stepping motor 105 secured to frame 102 and pivotable therewith in order to release roller 103 stepwise, two edge position sensing rollers 106, 107 abutting or moving on the lateral edges of strip 2, and a differential linkage system connecting the sensing rollers to frame 102.

The linkage system comprises two cranked arms 108 and 109, two connecting elements 110 and 111, a slide 112 and a slide guide 113 or rod connected to frame 102, along which slide 112 is movable against the action of a spring 114.

Figure 2:
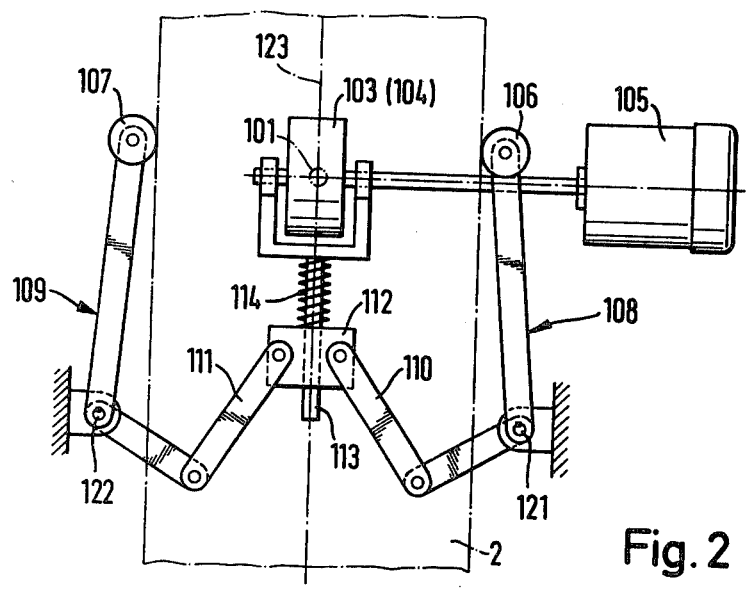
FIGS. 2 and 3 are simplified sketches illustrating the operation of the device in FIG. 1.

Cranked arms 108, 109 each comprise two lever arms 117, 118 and 119,120 respectively, firmly interconnected by a rod 115, 116. Rollers 106, 107 are pivotably mounted at the end of the top lever arms 117, 119 respectively, whereas the bottom arms 118, 120 and consequently the cranked arms are pivotably mounted around vertical stationary shafts 121, 122 (FIG. 2). The connecting elements 110, 111 are pivotably mounted at the ends of lever arms 118, 120 and at slide 112.

Figure 3:
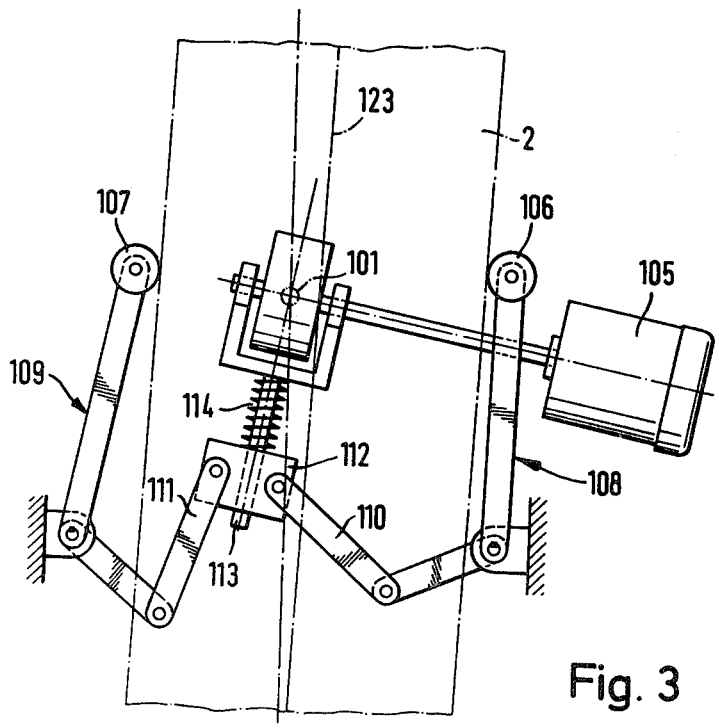

The kinematics or manner of operation of the device are clear from FIGS. 2 and 3. A paper strip 2 driven over the take-up roll 6 moves through the nip formed by rollers 103 and 104, which slow down or stepwise release the strip. In the inoperative position, i.e. when the centre line of strip 2 extends exactly through the axis of rotation 101 of frame 102, frame 102 is aligned so that the axes of rollers 103, 104 extend perpendicular to the longitudinal direction of strip 2 (FIG. 2).

If the strip shifts so that its centre line is at an angle to the normal longitudinal direction of movement of the strip, i.e. the centre line does not pass through the axis 101 or if the width of strip 2 varies asymmetrically, frame 102 and rollers 103, 104 are pivoted around axis 101 so that the rotating rollers 103, 104 apply a component of motion to the paper strip so as to compensate the shift (FIG. 3).

If the width of strip 2 varies symmetrically, rollers 106, 107 shift symmetrically, thus moving slide 112 on guide 113 without pivoting rollers 103, 104 around axis 101.

Spring 114 determines the force with which the sensing rollers abut the lateral edges of strip 2.

The device according to the invention has given excellent results in practice. The deviations of the paper strip from the set position can be kept below 0.2 to 0.1 mm. Even very large lateral shifts of the strip of approximately 10 c.m. (which are hardly likely to occur in practice) are compensated without difficulty in a very short time (after the strip has advanced about 70 cm) and without any tendency to oscillate.

In the previously described embodiment, strip 2 is driven via take-up roll 6, and rollers 103, 104 brake the strip roller 103 by stepwise operation of the motor 105 whilst roller 104 applies a braking force. Of course, the converse arrangement is possible - i.e. strip 2 can be driven by rollers 103 or 104 and slowed down by other means if necessary (e.g. to obtain tension).

I claim:

1. A strip guiding device comprising a pair of rollers each mounted on opposite sides of the strip and in contact therewith; means mounting said rollers to pivot around an axis substantially perpendicular to the plane of the strip; means driving at least one roller; two mechanical sensing elements abutting opposite lateral edges of the strip and a differential linkage coupling the sensing elements to said mounting means so that if the strip shifts laterally the sensing elements move the mounting means to pivot the pair of rollers around said axis to impart a component of motion in the opposite direction to the shift by said at least one roller to the strip, thus moving it back, said differential linkage including means for permitting said sensing elements to move symmetrically toward or away from each other to compensate for varying strip widths without pivoting said pair of rollers about said axis.

2. A device according to claim 1, wherein the differential linkage comprises two cranked arms, two fixed shafts, two connecting elements, a slide, a spring, and a slide guide; the cranked arms being pivotable around said shafts mounted perpendicular to the strip plane, each cranked arm bearing a sensing element at one end, the connecting elements being pivoted to the slide and to the other end of each cranked arm, the slide being slidable along the slide guide against the action of said spring, and the slide guide being connected to the mounting means and pivotable therewith around said axis.

3. A device according to claim 2, wherein said driving means comprises a motor coupled to said at least one roller and mounted on said mounting means.

* * * * *